United States Patent
Choe et al.

(10) Patent No.: US 12,079,080 B2
(45) Date of Patent: *Sep. 3, 2024

(54) MEMORY CONTROLLER PERFORMING SELECTIVE AND PARALLEL ERROR CORRECTION, SYSTEM INCLUDING THE SAME AND OPERATING METHOD OF MEMORY DEVICE

(71) Applicant: SAMSUNG ELECTRONICS CO., LTD., Suwon-si (KR)

(72) Inventors: Hyeokjun Choe, Hwaseong-si (KR); Heehyun Nam, Seoul (KR); Jeongho Lee, Gwacheon-si (KR); Younho Jeon, Gimhae-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,375

(22) Filed: Jun. 15, 2023

(65) Prior Publication Data
US 2023/0325277 A1   Oct. 12, 2023

Related U.S. Application Data

(63) Continuation of application No. 17/510,898, filed on Oct. 26, 2021, now Pat. No. 11,720,442.

(30) Foreign Application Priority Data

Nov. 18, 2020 (KR) .................... 10-2020-0154848

(51) Int. Cl.
*H03M 13/15* (2006.01)
*G06F 3/06* (2006.01)
(Continued)

(52) U.S. Cl.
CPC ........ *G06F 11/1068* (2013.01); *G06F 3/0619* (2013.01); *G06F 3/0656* (2013.01);
(Continued)

(58) Field of Classification Search
CPC .. G06F 11/1068; G06F 3/0619; G06F 3/0656; G06F 3/0659; G06F 3/0679; G06F 11/0772
See application file for complete search history.

(56) References Cited

U.S. PATENT DOCUMENTS

| | | |
|---|---|---|
| 9,448,905 B2 | 9/2016 | Kang et al. |
| 10,250,281 B2 | 4/2019 | Achtenberg et al. |

(Continued)

FOREIGN PATENT DOCUMENTS

KR   10-1182601   9/2012

OTHER PUBLICATIONS

Office Action dated Nov. 25, 2022 in corresponding U.S. Appl. No. 17/510,898.

*Primary Examiner* — Guy J Lamarre
(74) *Attorney, Agent, or Firm* — F. Chau & Associates, LLC

(57) ABSTRACT

A memory controller is provided that is configured to control a memory accessed by a device connected to a host processor via a bus. The memory controller is configured to control a memory accessed by a device connected to a host processor via a bus, and includes a first interface circuit configured to communicate with the host processor; a second interface circuit configured to communicate with the memory; an error detection circuit configured to detect an error present in data received from the second interface circuit in response to a first read request received from the first interface circuit; a variable error correction circuit configured to correct the error based on at least one of a reference latency and a (Continued)

reference error correction level included in a first error correction option; and a fixed error correction circuit configured to correct the error in parallel with an operation of the variable error correction circuit.

20 Claims, 11 Drawing Sheets

(51) Int. Cl.
  *G06F 11/07* (2006.01)
  *G06F 11/10* (2006.01)
(52) U.S. Cl.
  CPC .......... *G06F 3/0659* (2013.01); *G06F 3/0679* (2013.01); *G06F 11/0772* (2013.01)

(56) References Cited

U.S. PATENT DOCUMENTS

| | | |
|---|---|---|
| 10,503,588 B2 | 12/2019 | Kim |
| 11,720,442 B2* | 8/2023 | Choe ................... G06F 3/0659 714/764 |
| 2003/0009721 A1 | 1/2003 | Hsu et al. |
| 2005/0204233 A1 | 9/2005 | Shin et al. |
| 2015/0121166 A1 | 4/2015 | Goodman et al. |
| 2016/0004438 A1 | 1/2016 | Moon et al. |
| 2019/0068219 A1 | 2/2019 | Bhatia et al. |
| 2019/0317855 A1* | 10/2019 | Prathapan ................ G11C 7/22 |
| 2019/0391936 A1* | 12/2019 | Stalley ................ G06F 13/4009 |
| 2020/0125272 A1 | 4/2020 | Greco et al. |
| 2020/0372940 A1 | 11/2020 | Park et al. |
| 2022/0156146 A1 | 5/2022 | Choe et al. |
| 2022/0269432 A1 | 8/2022 | Lee et al. |

* cited by examiner

MEMORY CONTROLLER PERFORMING SELECTIVE AND PARALLEL ERROR CORRECTION, SYSTEM INCLUDING THE SAME AND OPERATING METHOD OF MEMORY DEVICE

CROSS-REFERENCE TO RELATED APPLICATION(S)

This U.S. non-provisional utility patent application is a continuation of co-pending U.S. patent application Ser. No. 17/510,898, titled MEMORY CONTROLLER PERFORMING SELECTIVE AND PARALLEL ERROR CORRECTION, SYSTEM INCLUDING THE SAME AND OPERATING METHOD OF MEMORY DEVICE and filed on Oct. 26, 2021, which, in turn, claims priority under 35 U.S.C. § 119 to Korean Patent Application No. 10-2020-0154848, filed on Nov. 18, 2020, in the Korean Intellectual Property Office, the disclosures of which are incorporated by reference herein in their entireties.

FIELD

The inventive concept generally relates to memory devices, and more particularly relates to a memory controller that performs selective and parallel error correction, a system including the same, and an operating method of a memory device.

DISCUSSION OF RELATED ART

A system that performs data processing, such as a computing system, may include a central processing unit (CPU), a memory device, input/output devices, and a root complex that transmits information between devices constituting the system.

The memory device may include a storage class memory (SCM). The SCM has the advantage of large capacity and non-volatility, but has longer latency performance compared to dynamic random-access memory (DRAM). Therefore, if the SCM performs error correction in a data read operation or if latency increases due to garbage collection, or the like, quality of service (QoS) may deteriorate.

SUMMARY

Embodiments of the present disclosure provide a memory controller that performs selective and parallel error correction according to an error correction option set to improve quality of service, a system including the same, and an operating method of a memory device.

According to an embodiment of the inventive concept, there is provided a memory controller including a first interface circuit configured to communicate with a host processor; a second interface circuit configured to communicate with a memory; an error detection circuit configured to detect an error present in data read from the second interface circuit in response to a first read request received from the first interface circuit; a variable error correction circuit configured to correct the detected error based on at least one of a reference latency and a reference error correction level included in a first error correction option; and a fixed error correction circuit configured to correct the detected error in parallel with an operation of the variable error correction circuit.

According to an embodiment of the inventive concept, there is provided a method including receiving a first read request from a host processor; transmitting the first read request to a memory and reading data corresponding to the first read request from the memory; detecting an error of the read data; correcting the error included in the read data based on at least one of a reference latency or a reference error correction level included in a first error correction option; and providing first correction data to the host processor.

According to an embodiment of the inventive concept, there is provided a system including a host processor including at least one core configured to execute instructions; a memory controller connected to the host processor via a bus; and a memory configured to be accessed through the memory controller, wherein the memory controller may read data corresponding to the first read request of the host processor from the memory, and perform in parallel a first error correction operation based on at least one of a reference latency or a reference error correction level included in a first error correction option and a second error correction operation based on a maximum error correction level on an error included in the data.

BRIEF DESCRIPTION OF THE DRAWINGS

Embodiments of the inventive concept will be more clearly understood from the following detailed description taken in conjunction with the accompanying drawings, in which.

DETAILED DESCRIPTION

Hereinafter, various embodiments of the inventive concept will be described with reference to the accompanying drawings.

Figure 1:
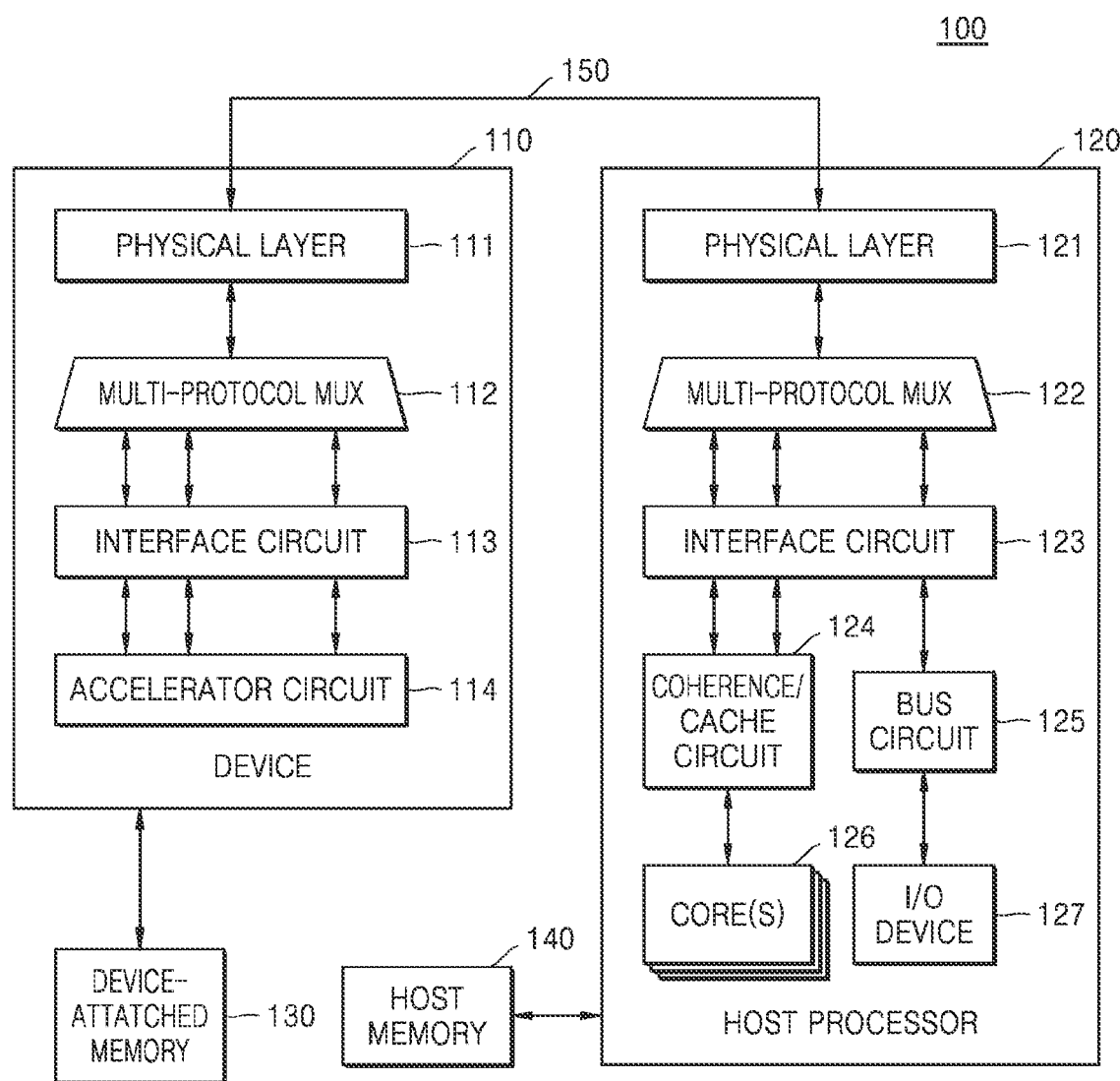
FIG. 1 is a block diagram illustrating a system according to an embodiment of the inventive concept.

FIG. 1 illustrates a system 100 according to an embodiment of the inventive concept.

The system 100 may include any computing system or element thereof. The system 100 includes a device 110 and a host processor 120, which communicate with each other. For example, the system 100 may be included in a stationary computing system such as a desktop computer, a server, a kiosk, or the like, or may be included in a portable computing system such as a laptop computer, a mobile phone, a wearable device, or the like. In addition, in some embodiments, the system 100 may be included in a system-on-chip (SoC) or a system-in-package (SiP), in which the device 110 and the host processor 120 are implemented in one chip or package.

As shown in FIG. 1, the system 100 may include the device 110, the host processor 120, a device-attached memory 130, and a host memory 140. In some embodiments, the device-attached memory 130 may be omitted from the system 100.

Referring to FIG. 1, the device 110 and the host processor 120 may communicate with each other via a link 150 and may perform transmission or reception of messages therebetween over the link 150. Although embodiments of the inventive concept will be described with reference to the link 150 that is based on the compute express link (CXL) specification supporting CXL protocols, such as under CXL Specification 2.0, in alternate embodiments the device 110 and the host processor 120 may communicate with each other based on coherent interconnect techniques, such as, but not limited to, an XBus protocol, an NVLink protocol, an Infinity Fabric protocol, a cache coherent interconnect for accelerators (CCIX) protocol, and/or a coherent accelerator processor interface (CAPI).

In some embodiments, the link 150 may support multiple protocols, and messages may be transferred via the multiple protocols. For example, the link 150 may support CXL protocols including a non-coherent protocol (for example, CXL.io), a coherent protocol (for example, CXL.cache), and a memory access or memory protocol (for example, CXL.mem). In some embodiments, the link 150 may support a protocol, such as, but not limited to, peripheral element interconnect (PCI), PCI express (PCIe), universal serial bus (USB), or serial advanced technology attachment (SATA). Herein, a protocol supported by the link 150 may also be referred to as an interconnect protocol.

The device 110 may refer to any device for providing a useful function to the host processor 120 and, in some embodiments, may correspond to an accelerator conforming to the CXL specification. For example, software running on the host processor 120 may offload at least some of its computing and/or input/output (I/O) operations to the device 110. In some embodiments, the device 110 may include at least one of a programmable element such as a graphics processing unit (GPU) or a neural processing unit (NPU), a fixed function-providing element such as an intellectual property (IP) core, and a reconfigurable element such as a field programmable gate array (FPGA). As shown in FIG. 1, the device 110 may include a physical layer 111, a multi-protocol multiplexer 112, an interface circuit 113, and an accelerator circuit 114 and may communicate with the device-attached memory 130.

The accelerator circuit 114 may perform a useful function, which the device 110 provides to the host processor 120, and may also be referred to as accelerator logic. If the device-attached memory 130 is included in the system 100 as shown in FIG. 1, the accelerator circuit 114 may communicate with the device-attached memory 130, based on a protocol independent of the link 150 such as a device-specific protocol. In addition, as shown in FIG. 1, the accelerator circuit 114 may communicate with the host processor 120 via the interface circuit 113 by using multiple protocols.

The interface circuit 113 may determine one of the multiple protocols, based on a message for communication between the accelerator circuit 114 and the host processor 120. The interface circuit 113 may be connected to at least one protocol queue included in the multi-protocol multiplexer 112 and may transmit a message to and receive a message from the host processor 120 via the at least one protocol queue. In some embodiments, the interface circuit 113 and the multi-protocol multiplexer 112 may be integrated into one element. In some embodiments, the multi-protocol multiplexer 112 may include multiple protocol queues respectively corresponding to multiple protocols that are supported by the link 150. In addition, in some embodiments, the multi-protocol multiplexer 112 may perform arbitration between communications by different protocols and may provide selected communications to the physical layer 111. In some embodiments, the physical layer 111 may be connected to a physical layer 121 of the host processor 120 via a single interconnect, a bus, a trace, or the like.

The host processor 120 may be a main processor such as a central processing unit (CPU) of the system 100, and, in some embodiments, may correspond to a host processor (or a host) conforming to a CXL specification. As shown in FIG. 1, the host processor 120 may be connected to the host memory 140 and may include the physical layer 121, a multi-protocol multiplexer 122, an interface circuit 123, a coherence/cache circuit 124, a bus circuit 125, at least one core 126, and an I/O device 127.

The at least one core 126 may execute instructions and may be connected to the coherence/cache circuit 124. The coherence/cache circuit 124 may include a cache hierarchy and may also be referred to as coherence/cache logic. As shown in FIG. 1, the coherence/cache circuit 124 may communicate with the at least one core 126 and the interface circuit 123. For example, the coherence/cache circuit 124 may allow communication via two or more protocols including a coherent protocol and a memory access protocol. In some embodiments, the coherence/cache circuit 124 may include a direct memory access (DMA) circuit. The I/O device 127 may be used to communicate with the bus circuit 125. For example, the bus circuit 125 may be PCIe logic, and the I/O device 127 may be a PCIe I/O device.

The interface circuit 123 may allow communication between the device 110 and elements, for example, the coherence/cache circuit 124 and the bus circuit 125, of the host processor 120. In some embodiments, the interface circuit 123 may allow communication of a message and/or data between the device 110 and the elements of the host processor 120 according to multiple protocols, for example, a non-coherent protocol, a coherent protocol, and a memory protocol. For example, the interface circuit 123 may determine one of the multiple protocols, based on a message and/or data for communication between the device 110 and the elements of the host processor 120.

The multi-protocol multiplexer 122 may include at least one protocol queue. The interface circuit 123 may be connected to the at least one protocol queue and may transmit a message to and receive a message from the device 110 via the at least one protocol queue. In some embodiments, the interface circuit 123 and the multi-protocol multiplexer 122 may be integrated into one element. In some embodiments, the multi-protocol multiplexer 122 may include multiple protocol queues respectively corresponding to multiple protocols that are supported by the link 150. In addition, in some embodiments, the multi-protocol multiplexer 122 may perform arbitration between communications by different protocols and may provide selected communications to the physical layer 121.

Figure 2A:
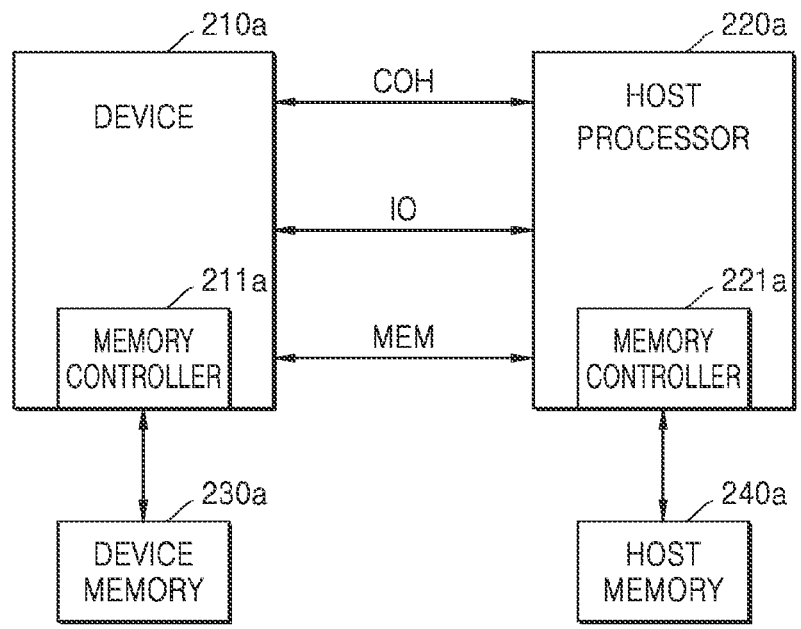
FIGS. 2A and 2B are block diagrams illustrating systems according to an embodiment of the inventive concept.
Figure 2B:
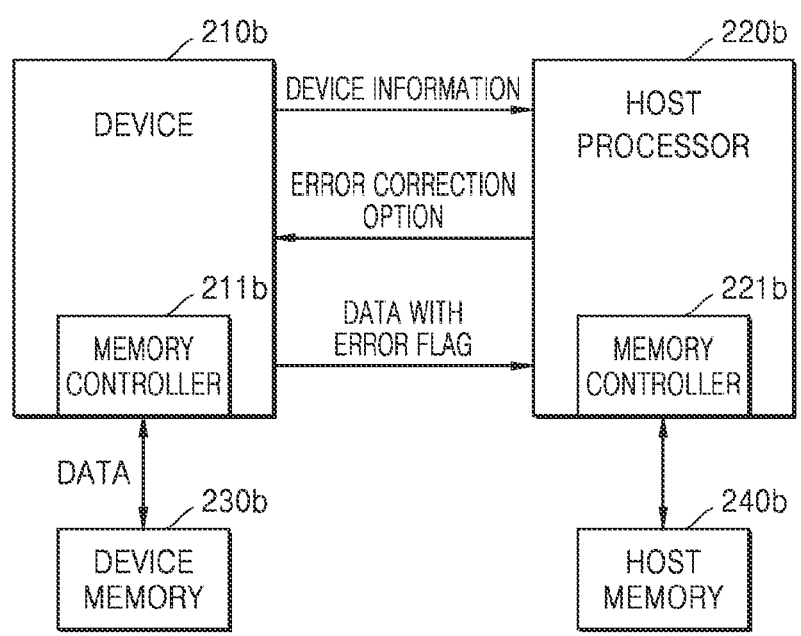

FIGS. 2A and 2B illustrate systems 200a and 200b according to an embodiment of the inventive concept.

As shown in FIG. 2A, the system 200a may include a device 210a, a host processor 220a, a device memory 230a, and a host memory 240a. In some embodiments, the device memory 230a may correspond to the device-attached memory 130 of FIG. 1.

Like those described with reference to FIG. 1, the device 210a and the host processor 220a may communicate with each other based on multiple protocols. Multiple protocols may include a memory protocol MEM, a coherent protocol COH, and a non-coherent protocol 10. In some embodiments, the memory protocol MEM, the coherent protocol COH, and the non-coherent protocol 10 may respectively correspond to CXL Specification 2.0 protocols CXL.mem, CXL.cache, and CXL.io. The memory protocol MEM may define transactions between a master and a subordinate. For example, the memory protocol MEM may define transactions from the master to the subordinate and transactions from the subordinate to the master. The coherent protocol COH may define interactions between the device 210a and the host processor 220a. For example, an interface of the coherent protocol COH may include three channels including request, response and data. The non-coherent protocol 10 may provide a non-coherent load/store interface for the input/output devices 210a.

In some embodiments, the device 210a may correspond to a Type 3 CXL device defined in the CXL specification. In this case, the device 210a and the host processor 220a may use the memory protocol MEM and non-coherent protocol 10 to communicate with each other.

The device 210a may communicate with the device memory 230a and may include a memory controller 211a for accessing the device memory 230a. In some embodiments, different from that shown in FIG. 2A, the memory controller 211a may be outside the device 210a and may be integrated with the device memory 230a. In addition, the host processor 220a may communicate with the host memory 240a and may include the memory controller 221a for accessing the host memory 240a. In some embodiments, different from that shown in FIG. 2A, the memory controller 221a may be outside the host processor 220a and may be integrated with the host memory 240a. Referring to FIG. 2B, the system 200b may include a device 210b, a host processor 220b, a device memory 230b, and a host memory 240b. The system 200b of FIG. 2B may be considered an embodiment of the system 200a of FIG. 2A. According to an embodiment of the inventive concept, the device 210b may provide device information to the host processor 220b. The host processor 220b may provide an error correction option to the device 210b to determine an error correction level and/or an error correction level of the device 210b based on the device information.

The error correction option may be set by the device 210b itself. In this case, the device 210b may utilize device information and/or information of the device memory 230b. The device 210b may read data from the device memory 230b according to a read request from the host processor 220b, and perform an error correction operation according to the error correction option set with respect to the read data. The device 210b may provide an error flag indicating error information together with the corrected data to the host processor 220b. If the above-described device 210b is implemented as the Type 3 CXL device, the device 210b may process the request of the host processor 220b through the memory protocol MEM, and process a device discovery or an error reporting and management through the non-coherent protocol 10.

According to the present embodiment, the device memory 230b may be implemented as various types of memory, and as an example, as a storage class memory (SCM).

The SCM has the characteristics of non-volatility and a volatile memory at the same time, and may be accessed in byte units, and thus, its use range is expanding. For example, the SCM may include phase-change RAM (PCM), ferro-electric RAM (FeRAM), magnetic RAM (MRAM), resistive RAM (RRAM), and STT-MRAM.

As one factor for evaluating a quality of service (QoS), a latency, for example, a tail latency, may be used. In particular, the SCM has the advantage of large capacity and non-volatility, but has a lower latency performance than dynamic random-access memory (DRAM). Therefore, an error correction operation may be performed in a data read operation, or a latency may increase due to a garbage collection. In addition, because the SCM has a non-deterministic latency characteristic, the QoS may be degraded, and thus it is necessary to reduce the tail latency.

According to a comparative example, various methods may be used to increase the QoS. As an example, the host processor 220b may monitor a load level of the device 210b and control processing of a request transmitted to the device 210b according to the load level.

For example, the device 210b may determine the load level based on queued requests, an internal resource usage, and a used bandwidth. Thereafter, the device 210b may add a field item DevLoad indicating the load level to a response message (e.g., 410 of FIG. 4) and transmit the response message to the host processor 220. For example, the device 210b may classify the load level into four steps and transmit the load level to the host processor 220b. If the device 210b includes a plurality of memories, the device 210b may classify and transmit the load level with respect to each memory. The host processor 220b may perform throttling on the device 210b based on information including the load level provided from the device 210b.

In addition to the load level, the tail latency may be a factor that determines the QoS. Accordingly, the system 200b according to the present embodiment may perform a series of operations to prevent the tail latency from exceeding a reference value. The host processor 220b may stall until a response corresponding to a request provided to the device 210b is received. This may further increase the tail latency.

Accordingly, in order to reduce the tail latency and increase the QoS, the device 210b according to the present embodiment may first provide the response to the request of the host processor 220b within a limit not exceeding a specific latency. For example, as a response to a read request, a time taken to transmit corrected data may be predicted to exceed the specific latency. In this case, the device 210b may sacrifice an accuracy of error correction and provide the host processor 220b with data including an error with a fast latency.

The operation of the device 210b according to the present embodiment may be referred to as a selective error correction operation. The selective error correction operation may mean that while an error correction process does not exceed a reference latency, the error correction operation is performed at a maximum error correction level (or an error free state) of the device 210b, and while the error correction process is expected to exceed the reference latency, the error correction operation is performed at a low error correction level.

The host processor 220b may refer to the message (e.g., 410 in FIG. 4) transmitted from the device 210b to determine a maximum value of an error correction level achievable by the device 210b (that is, a maximum error correction level) as well as minimum and maximum values of a latency achievable by the device 210b.

The maximum error correction level and/or the minimum and maximum values of the latency of the device 210b may be determined based on characteristics of the device 210b such as the performance of the device 210b, the load level, and a type of memory. The error correction level means the accuracy of error correction that the device 210b targets, and the higher the value is, the more detected errors the device 210b may be corrected.

The host processor 220b may set an error correction option including the reference error correction level and the reference latency of the device 210b. For example, the host processor 220b may set the error correction option so that the device 210b performs error correction having a certain accuracy or higher and the error correction operation does not exceed the reference latency. An error correction option setting message may be the same as 420 of FIG. 4.

Thereafter, if the host processor 220b transmits a read request to the device 210b, the device 210b may perform the error correction operation based on the error correction option and respond to the host processor 220b. The device 210b may transmit a response message and the corrected data to the host processor 220b together within the reference latency. The response message may include an error flag indicating whether there is an error in the corrected data. The host processor 220b may determine an accuracy of the received corrected data based on the error flag. The host processor 220b may request data from which the error is completely corrected again from the device 210b if necessary, and the device 210b may perform the error correction operation until the request is received and provide the data from which the error is completely corrected to the host processor 220b.

As described above, the device 210b performs the selective error correction operation based on the reference latency and the maximum error correction level, and thus, a time during which the operation of the host processor 220b stalls may be reduced, thereby improving the QoS.

Figure 3:
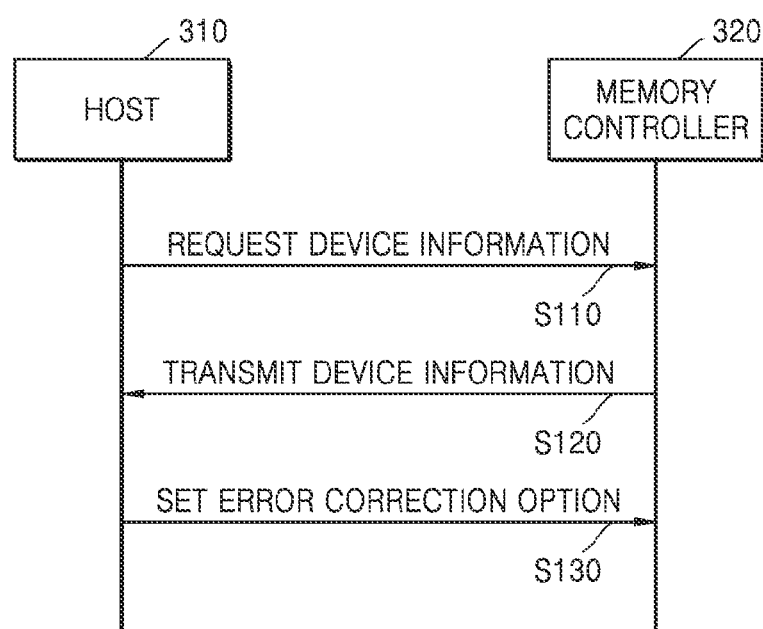
FIG. 3 is a flowchart diagram illustrating a method of setting an error correction option according to an embodiment of the inventive concept.

FIG. 3 illustrates a method of setting an error correction option according to an embodiment of the inventive concept.

A host 310 may include the host processor (e.g., 120 in FIG. 1, 220a in FIG. 2A or 220b in FIG. 2B) and the host memory (e.g., 140 in FIG. 1, 240a in FIG. 2A or 240b in FIG. 2B). Further, the memory controller 320 may correspond to the memory controller 211a of FIG. 2A or 211b of FIG. 2B.

Referring to FIGS. 2B and 3 together, the host 310 may request device information from the memory controller 320 (S110).

The memory controller 320 may transmit information about the device 210b to the host 310 (S120). Operation S120 may be performed by transmitting a response message to operation S110. For example, operation S120 may be performed through a Subordinate to Master (S2M) transaction of the memory protocol CXL.mem, and as an example, the response message may be as 410 of FIG. 4.

The host 310 may set the error correction option of the device 210b based on information included in the response message (S130). The error correction option may be set through an M2S transaction of the memory protocol CXL.mem. The host 310 may set the error correction option, which is a reference for an error correction operation of the device 210b, based on the device information received in operation S120. An error correction option setting message may include an error correction level and/or a reference latency based on whether the device 210b performs the error correction operation, as shown in 420 of FIG. 4. As another example, the memory device 320 may set the error correction option in consideration of the error correction option received from the host 310 and device information or information of the device memory 230a attached to the device.

The above-described operations S110 to S130 may be performed by transmitting any request from the host 310 to the memory controller 320. As another example, operations S110 to S130 may be performed during a booting stage of a system.

Figure 4:
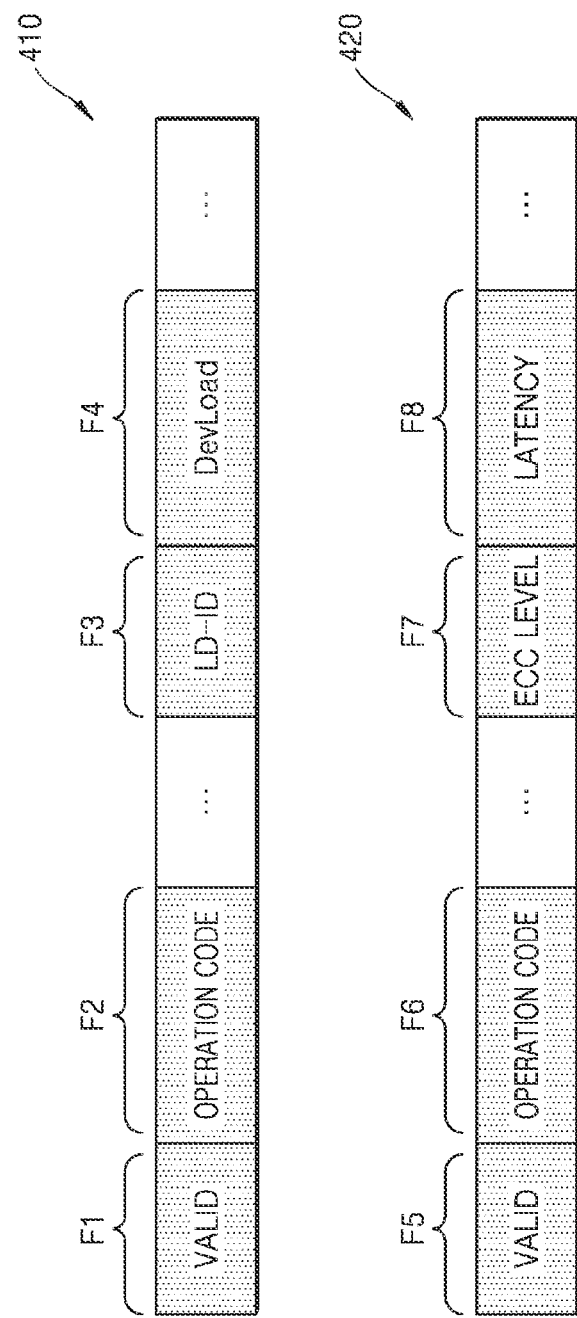
FIG. 4 is a data structure diagram that illustrates messages according to an embodiment of the inventive concept.

FIG. 4 illustrates messages according to an embodiment of the inventive concept.

Referring to FIGS. 2A, 2B, 3 and 4 together, a response message 410 may be a message transmitted in operation S120 of FIG. 3, and an error correction option setting message 420 may be a message transmitted in operation S130 of FIG. 3.

The response message 410 may include first to fourth fields F1 to F4, and may further include additional fields. Each of the fields F1 to F4 included in the response message 410 may include at least one bit, and information corresponding to a value of the at least one bit may be defined by a protocol.

For example, the first field F1 is a valid signal and may include 1 bit indicating that the response message 410 is a valid message. The second field F2 is an operation code and may include a plurality of bits defining an operation corresponding to the response message 410. For example, the operation code of the second field F2 may indicate invalidation for updating metadata. The third field F3 is an identifier of a logical device (LD), and may be included if the device 210b is implemented as a multi-logical device (MLD). The fourth field F4 is a load level, and may include a plurality of bits indicating a load level of the device 210b at the current time.

The response message 410 may include device information including a minimum value of latency achievable by the device 210b, and may further include various types of information required to perform a selective error correction operation.

The error correction option setting message 420 may include fifth to eighth fields F5 to F8, and may further include additional fields. Each of the fields F5 to F8 included in the error correction option setting message 420 may include at least one bit, and information corresponding to a value of the at least one bit may be defined by a protocol.

The fifth field F5 and the sixth field F6 of the error correction option setting message 420 may be similar to the first field F1 and the second field F2 of the response message 410, respectively, and thus redundant descriptions thereof may be omitted.

The seventh field F7 is a reference error correction level, and may indicate a target accuracy when the device 210b performs the error correction operation. The device 210b may perform the error correction operation based on the reference error correction level included in the seventh field F7.

The eighth field F8 is latency information, and may include a reference latency for determining whether the device 210b performs the selective error correction operation. The reference latency may be a value equal to or greater than the minimum latency achievable by the device 210b. According to the error correction option setting method, the reference latency may be a value less than or equal to the maximum latency achievable by the device 210b.

For example, the device 210b may perform the error correction operation aiming at an accuracy equal to or higher than an error correction level within a limit not exceeding the reference latency.

If the device 210b is implemented as an MLD, the host processor 220b may set different error correction options with respect to each of the logical devices 210b. In this case, the error correction option setting message 420 may further include a logical device identifier field LD-ID.

Figure 5:
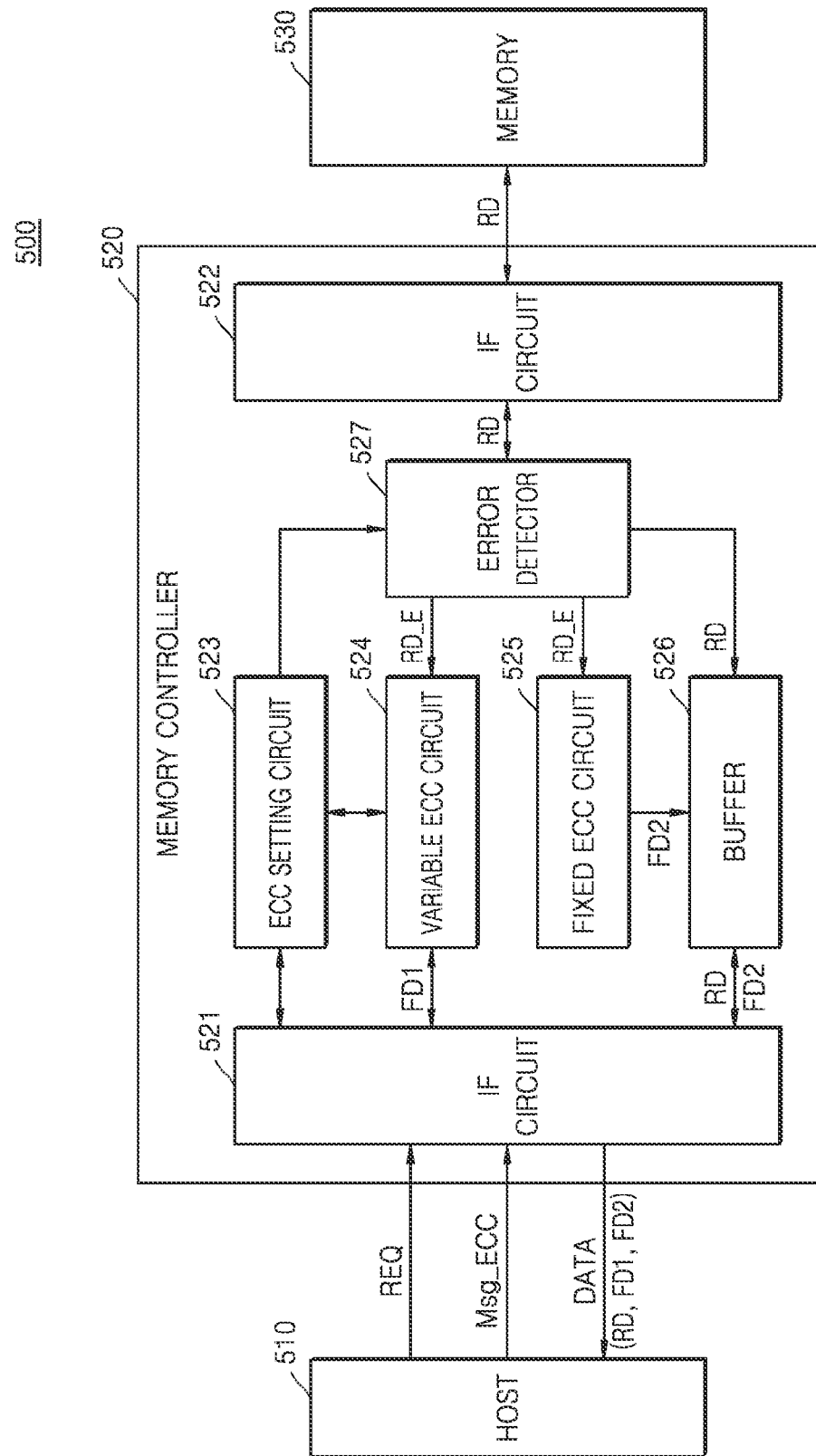
FIG. 5 is a block diagram illustrating a system according to an embodiment of the inventive concept.

FIG. 5 illustrates a system 500 according to an embodiment of the inventive concept.

Referring to FIG. 5, a memory controller 520 may include a first interface circuit 521, a second interface circuit 522, an error correction code (ECC) setting circuit 523, a variable ECC circuit 524, a fixed ECC circuit 525, a buffer 526 and an error detector 527. The memory controller 520 may correspond to one of the above-described memory controllers (e.g., 211a and 211b in FIGS. 2A and 2B, and 320 in FIG. 3). The host 510 may include a host processor and a host memory of FIGS. 1, 2A, and/or 2B.

The first interface circuit 521 may communicate with the host 510. In an embodiment, the first interface circuit 521 may communicate with the host 510 through an accelerator circuit (e.g., 114 in FIG. 1). The first interface circuit 521 may receive an error correction option setting message Msg_ECC from the host 510 and may receive a read or write request REQ. Also, the first interface circuit 521 may transmit at least one of the read data RD, first corrected data FD1 and second corrected data FD2 to the host 510 together with a response to the read request.

The second interface circuit 522 may communicate with the memory 530. The memory 530 may refer to any storage medium capable of storing information. For example, the memory 530 may be manufactured by a semiconductor process, may include a volatile memory such as static random-access memory (SRAM), dynamic random-access memory (DRAM), etc., and may also include a non-volatile memory such as flash memory, resistive random-access memory (RRAM), etc. As described above, the memory 530 may include an SCM. Also, the memory 530 may include a plurality of logic devices. The second interface circuit 522 may provide a command and an address to the memory 530 and may receive a read data RD from the memory 530.

The ECC setting circuit 523 may receive the error correction option setting message Msg_ECC from the host 510 through the first interface circuit 521 and control operations of the error detector 527 and/or the variable ECC circuit 524 according to each field value of the error correction option setting message Msg_ECC. The ECC setting circuit 523 may provide an error correction level and/or a reference latency that are references for performing a selective error correction operation as a plurality of components.

The error detector 527 may detect whether there is an error in the read data RD read from the memory 530 and determine whether to correct the error. The error detector 527 may provide the read data with error RD_E to the variable ECC circuit 524 and/or the fixed ECC circuit 525 for error correction. If it is determined that read data RD is error-free, the error detector 527 may store the read data RD in the buffer 526.

As an example, the error detector 527 may determine whether to perform error correction of the read data RD with an accuracy of the reference error correction level within the reference latency based on the error correction level and/or the reference latency provided from the ECC setting circuit 523. If it is determined that error correction of the read data is performed, the error detector 527 may transmit the read data with error RD_E to the fixed ECC circuit 525, and if it is determined that error correction of the read data is not performed, the error detector 527 may transmit the read data with error RD_E to each of the variable ECC circuit 524 and the fixed ECC circuit 525.

In addition, the error detector 527 may include an error flag in a response message to a read request from the host 510. The error flag is a field indicating whether the error is included in the read data, and may have a value of 0 or 1.

The variable ECC circuit 524 and the fixed ECC circuit 525 may perform a series of operations for performing error correction of the read data with error RD_E read from the memory 530. For example, the variable ECC circuit 524 and the fixed ECC circuit 525 may correct an error bit included in the read data with error RD_E through an ECC decoding operation.

The variable ECC circuit 524 may perform error correction of the read data with error RD_E based on the reference error correction level provided from the ECC setting circuit 523. The variable ECC circuit 524 may provide the first corrected data FD1 to the host 510 through the first interface circuit 521.

The fixed ECC circuit 525 may not receive the reference error correction level from the ECC setting circuit 523 and may perform error correction of the read data with error RD_E based on a maximum accuracy. For example, the fixed ECC circuit 525 may generate the second corrected data FD2 in an error-free state. The fixed ECC circuit 525 may store the second corrected data FD2 in the buffer 526.

The memory controller 520 may repeatedly receive a read request for the same data from the host 510. As an example, the memory controller 520 may determine whether there is a redundant request for the same data based on an address included in the read request from the host 510. A read request received first according to a time order may be referred to as a first read request, and a read request received later may be referred to as a second read request.

The read data may be stored in the buffer 526 as a result of performing an operation for the first read request. In this regard, the memory controller 520 may fetch data stored in the buffer 526 as a response to the second read request and transmit the data to the host 510. At this time, the second corrected data FD2 in an error-free state may be transmitted to the host 510. An operation of generating a read command, providing the read command to the memory 530, and receiving data read from the memory 530 may be bypassed, and thus latency may be improved.

Figure 6:
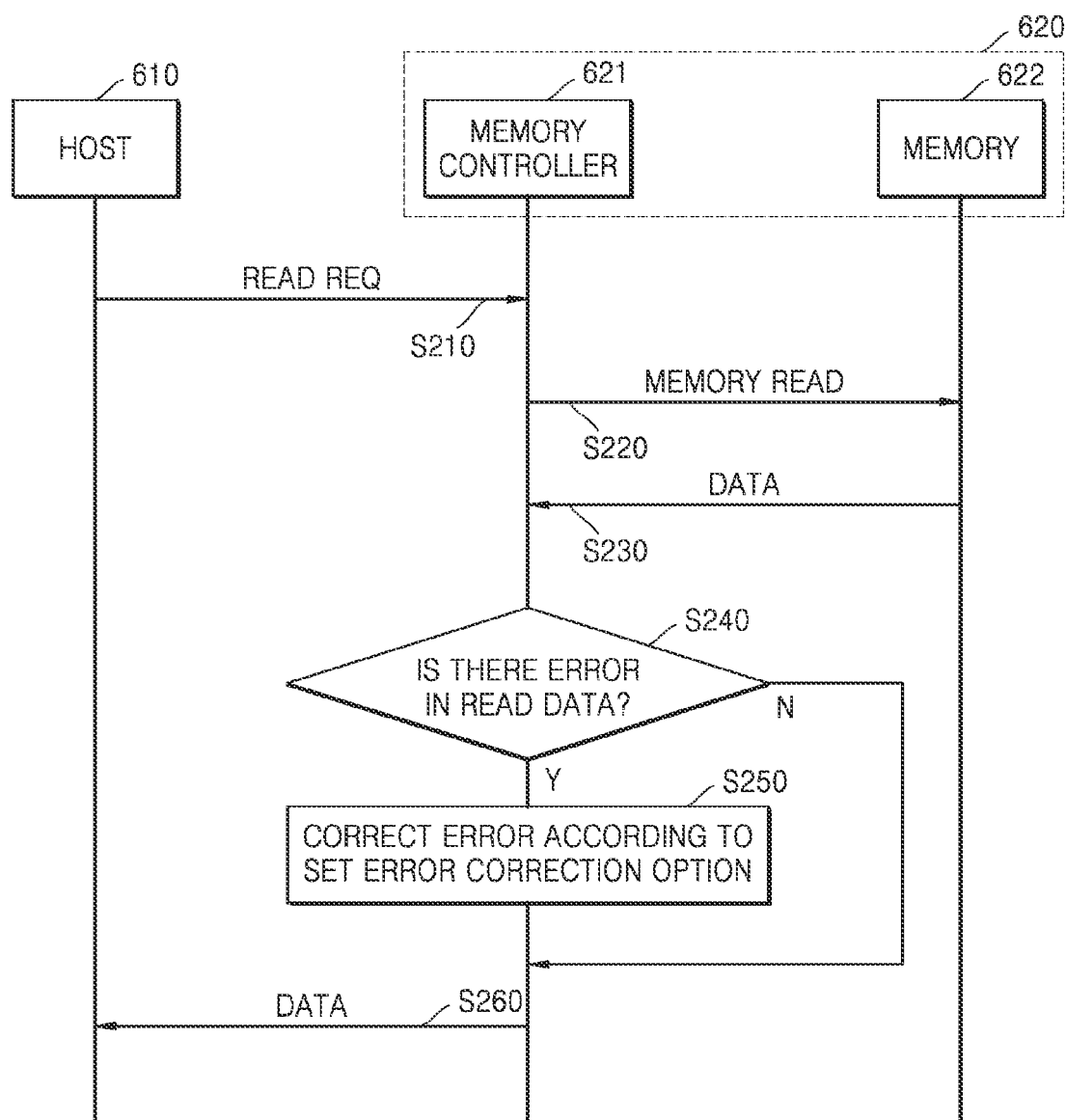
FIG. 6 is a flowchart illustrating a read operation according to an embodiment of the inventive concept.

FIG. 6 illustrates a read operation according to an embodiment of the inventive concept.

Referring to FIG. 6, a device 620 according to the present embodiment may be a Type 3 CXL device defined in the CXL specification. A host 610 may include a host processor and a host memory of FIGS. 1 to 2. In this regard, the host 610 may regard the device 620 as a disaggregated memory. According to the above-described memory protocol MEM, a master may correspond to the host 610 and a subordinate may correspond to the device 620. In addition, each operation described later may be performed through an M2S transaction or an S2M transaction of the memory protocol CXL.mem.

The host 610 may transmit a read request to a memory controller 621 (S210). As an example, the host 610 may set an error correction option of the device 620 through an operation of FIG. 3 before transmitting the read request. As another example, the host 610 may transmit an error correction option setting message of the device 620 together with the read request. As another example, the error correction option of the device 620 may be set by the device 620 itself. The information required to set the error correction option may include the device information described with reference to FIG. 3, and may further include various other information.

The memory controller 621 may transmit the read request to the memory 622 (S220) and receive the read data (S230).

The memory controller 621 may determine whether there is an error by performing an error detection operation on the read data (S240).

If there is an error in the read data, the memory controller 621 may perform the error correction operation of the read data according to the set error correction option (S250). For example, the memory controller 621 may determine whether the error correction operation may be performed on the detected error at a reference error correction level within a reference latency. Based on a result of the determination, the memory controller 621 may make the variable ECC circuit and/or the fixed ECC circuit perform the error correction operation.

Thereafter, the memory controller 621 may transmit the corrected data to the host 610 (S260). The corrected data may be in an error-free state or a state including the error according to the reference error correction level. As an example, if the error correction option is set by assigning a maximum weight to a latency, the memory controller 621 may immediately transmit the read data to the host 610 without correcting the error.

In this regard, an error flag may be used to indicate whether the data includes the error. For example, as the response to the read request in operation S210, the memory controller 621 may generate a response message including an error flag (e.g., 700 in FIG. 10) and transmit the response message to the host 610 together with the data. The error flag may indicate whether the corrected data to be transmitted includes the error, and may have a value of 0 or 1.

If there is no error in the data read in operation S240, the memory controller 621 may transmit the read data to the host 610 (S260). In this case, the error flag of the response message may have a different value from the error flag if there is an error.

Figure 7:
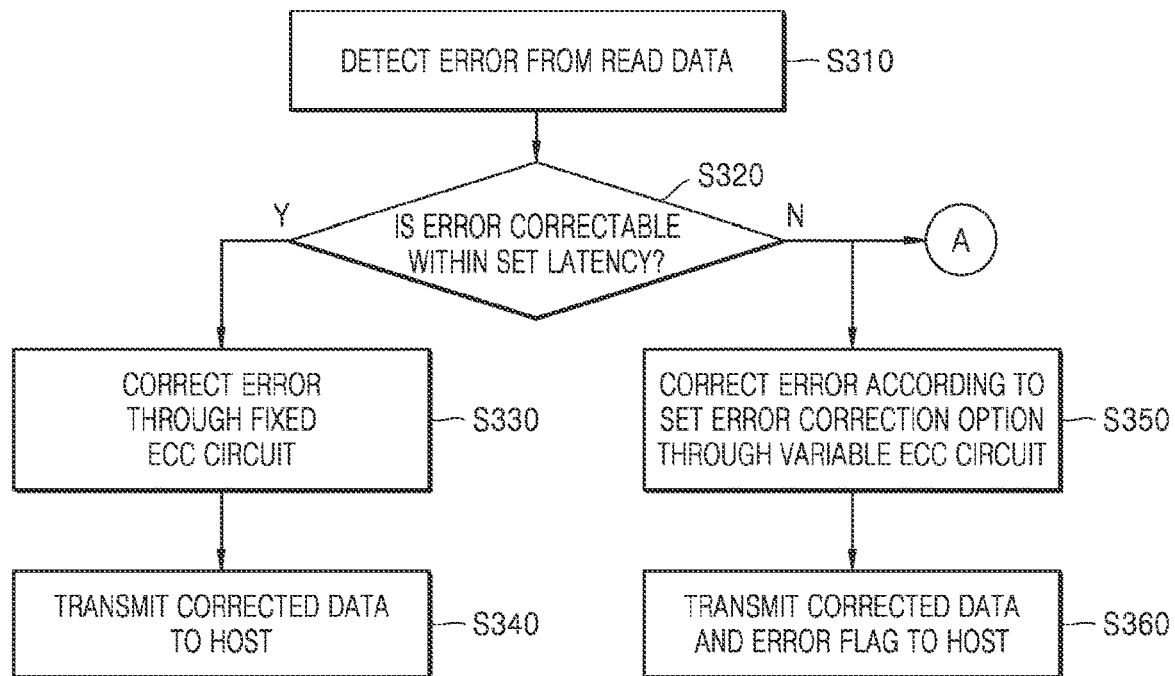
FIG. 7 is a flowchart diagram illustrating a selective error correction operation according to an embodiment of the inventive concept.

FIG. 7 illustrates a selective error correction operation according to an embodiment of the inventive concept.

FIG. 7 may illustrate an embodiment of operations S250 and S260 of FIG. 6, without limitation. Hereinafter, a process will be described after data is read from the memory 622 according to a read request from the host 610.

Referring to FIGS. 6 and 7 together, the memory controller 621 may detect an error in the data read from the memory 622 (S310). This may correspond to operation S240 of FIG. 6.

The memory controller 621 may determine whether the detected error is correctable within a reference latency (S320). The memory controller 621 may additionally consider an error correction level. For example, the memory controller 621 may determine whether error correction is possible at a host-selected reference error correction level within the host-selected reference latency limit.

If it is determined that the detected error is correctable in operation S320, the memory controller 621 may correct the detected error through a fixed ECC circuit (S330). The fixed ECC circuit may correct the read data in an error-free state regardless of the set error correction level. The corrected data may be stored in a buffer through the fixed ECC circuit.

The memory controller 621 may transmit the corrected data to the host (S340). The memory controller 621 may transmit a response message along with the corrected data, and the response message may include content indicating that the corrected data is in the error-free state.

If it is determined that the detected error is not correctable at the reference error correction level within the reference latency in operation S320, the memory controller 621 may perform an operation A and correct the detected error through a variable ECC circuit in parallel (S350). Operation A may be performed in parallel with various other tasks of the device 620, and descriptions thereof are given with reference to FIG. 8. Because the variable ECC circuit corrects the error based on the reference error correction level, the error may be included in the corrected data.

The memory controller 621 may transmit the response message including the corrected data and an error flag to the host (S360). The corrected data may not be in the error-free state by the variable ECC circuit. Therefore, the error flag of the response message may indicate 1. The corrected data may be transmitted to the host 610 by the variable ECC circuit without passing through a buffer.

According to the above-described embodiments, the host 610 may receive data within the reference latency. In addition, the host 610 may selectively request data according to a situation, thereby managing resources efficiently.

Figure 8:
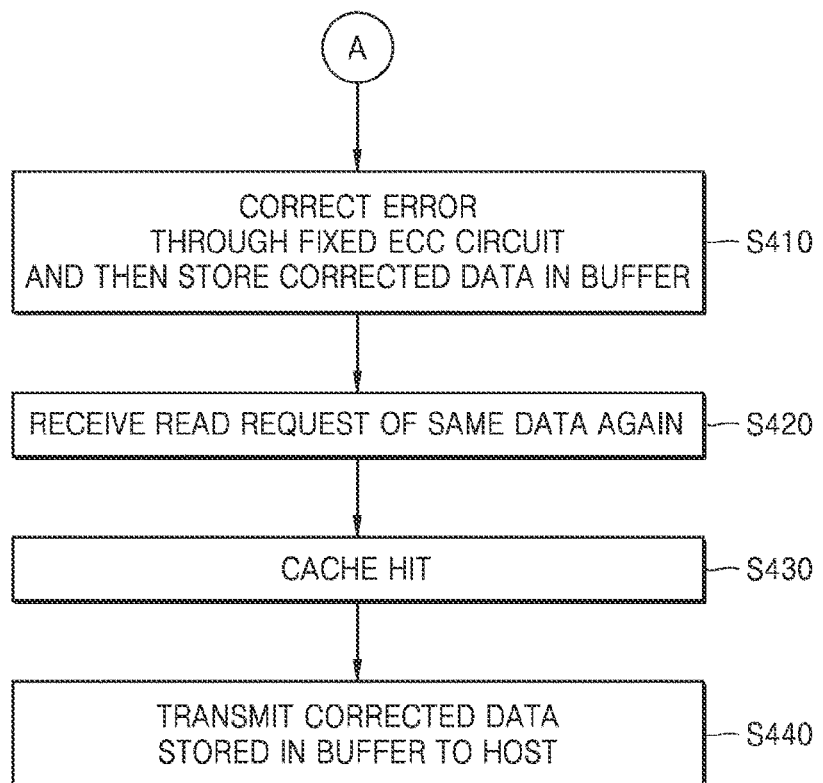
FIG. 8 is a flowchart diagram illustrating a parallel error correction operation according to an embodiment of the inventive concept.

FIG. 8 illustrates a parallel error correction operation according to an embodiment of the inventive concept.

As described above, if the memory controller 621 determines that an error is not correctable at a reference error correction level within a reference latency according to an error correction option, the memory controller 621 may perform an error correction operation through a variable ECC circuit. In this regard, the memory controller 621 may provide read data to a fixed ECC circuit in parallel with an operation of the variable ECC circuit. Accordingly, the variable ECC circuit and the fixed ECC circuit may perform the error operation in parallel so that first correction data corrected to a reference error correction level and second correction data corrected to an error-free state may be generated.

The operation of the variable ECC circuit is limited to a set rate, and thus, the first correction data may be generated at a faster rate than the second correction data. Accordingly, the first correction data may be provided to the host 610 within the latency set by the host 610. After receiving the first correction data, the host 610 may request the data in the error-free state again. In this case, the memory controller 621 may bypass a process of reading the data from the memory 622 and detecting the error (e.g., S220 to S240 in FIG. 6) and immediately transmit the second correction data to the host 610. As a result, the device 620 may improve latency with respect to a read operation and provide data with high accuracy to the host 610.

Referring to FIGS. 6 and 8, the memory controller 621 may perform the error correction operation through the fixed ECC circuit in parallel with operation S350 of FIG. 7 to store the corrected data in a buffer (S410). That is, the memory controller 621 may transmit the read data to the host 610 in response to a read request, and perform error correction of the read data separately. Thus, the data in the error-free state may be stored in the buffer.

Thereafter, the memory controller 621 may re-receive the read request for the same data from the host 610 (S420). The read request for the same data may be performed as a read retry or a delayed read, without limitation. The memory controller 621 may determine whether there is a repeat request for the same data based on an address included in the read request.

The memory controller 621 may determine a cache hit (S430). For example, the memory controller 621 may confirm whether data corresponding to the address included in the read request from the host 610 is stored in the buffer and determine there is a cache hit.

The memory controller 621 may transmit the corrected data stored in the buffer to the host 610 (S440). The memory controller 621 may transmit a response message to the read request received in operation S420 together with the corrected data to the host 610. In this regard, because the corrected data is in the error-free state, an error flag of an error-free response message may indicate 0.

Figure 9:
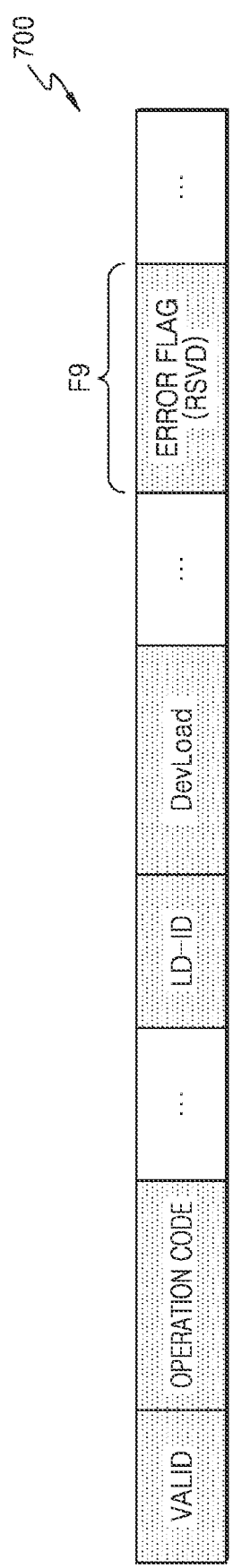
FIG. 9 is a data structure diagram that illustrates a response message according to an embodiment of the inventive concept.

FIG. 9 illustrates a response message 700 according to an embodiment of the inventive concept.

Referring to FIGS. 5 and 9 together, the response message 700 may be generated based on an S2M Data Responses (DRS) message of the CXL protocol. The response message 700 may include a plurality of fields, and descriptions redundant with those given above with reference to FIG. 4 are omitted.

The response message 700 according to the present embodiment may be generated as a response to a read request from the host 510 and may include an error flag (reserved) in a ninth field F9. The error flag may indicate whether an error is included in read data transmitted to the host 510 together with the response message 700.

For example, the error may be corrected by the variable ECC circuit 524 and/or the fixed ECC circuit 525 according to a selective error correction operation. For example, if the error is corrected by the variable ECC circuit 524, the error flag may be set to 1 when there is an error in the corrected data. As another example, if the fixed ECC circuit 525 corrects data in an error-free state, the error flag may be set to 0.

The host 510 may receive the response message 700 and perform an error correction operation on its own or request data from the memory controller 520 again based on the error flag included in the response message 700.

Figure 10:
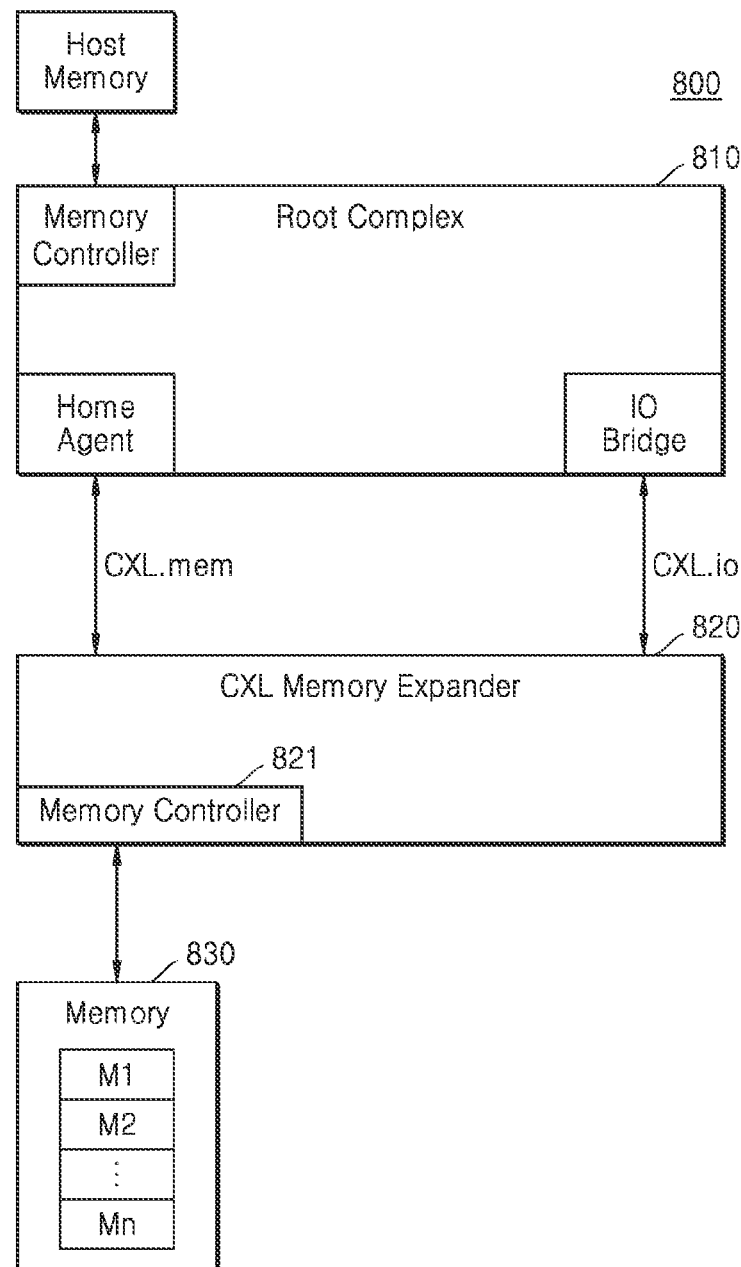
FIG. 10 is a block diagram illustrating a system according to another embodiment of the inventive concept.

FIG. 10 illustrates a system 800 according to another embodiment of the inventive concept. A case in which the above-described embodiments of the inventive concept are applied to a system including a type 3 CXL device defined in the CXL specification is described with reference to FIG. 10, but is not limited thereto, and the above-described embodiments may also be applied to a type 1 device or a type 2 device defined in the CXL specification.

Referring to FIG. 10, the system 800 may include a root complex 810, a CXL memory expander 820 connected thereto, and a memory 830. The root complex 810 may correspond to a host processor (e.g., 120 of FIG. 1, 220*a* of FIG. 2A, 220*b* of FIG. 2B). The root complex 810 may communicate with a host memory through a memory controller, the memory controller may correspond to the memory controller 221*a* of FIG. 2B, and the host memory may correspond to the host memory 240*a* of FIG. 2B. The root complex 810 may include a home agent and an input/output bridge. The home agent may communicate with the CXL memory expander 820 based on the memory protocol CXL.mem. Based on the CXL protocol, the home agent may correspond to an agent at the host side disposed to resolve the overall coherence of the system 800 with respect to a given address. The input/output bridge may communicate with the CXL memory expander 820 based on the non-coherent protocol CXL.io and include the input/output memory management unit IOMMU. The CXL memory expander 820 corresponds to a device (for example, 110 of FIG. 1, 210*a* of FIG. 2A, 210*b* of FIG. 2B), thereby performing a selective and/or parallel error correction operation according to the above-described embodiments.

The CXL memory expander 820 may include a memory controller 821. The memory controller 821 may perform operations of the memory controllers (211 of FIG. 2, 320 of FIG. 3, 520 of FIG. 5, and 621 of FIG. 6) described above with reference to FIGS. 1 to 9.

The memory controller 821 may be referred to as a memory interface circuit, and may access the memory 830 based on an interface of the memory 830. Further, according to an embodiment of the inventive concept, the CXL memory expander 820 may output data to the root complex 810 through the input/output bridge based on the non-coherent protocol CXL.io or a similar PCIe. The memory 830 may refer to any medium for storing data. As an example, the memory 830 may include a semiconductor memory device, for example, a non-volatile memory device such as a flash memory, a resistive random-access memory (RRAM), etc. and/or a volatile memory device such as a dynamic random-access (DRAM) memory), a static random-access memory (SRAM), etc.

The memory 830 may include a plurality of memory areas M1 to Mn, and each of the memory areas M1 to Mn may be implemented as various units of memory. As an example, if the memory 830 includes a plurality of volatile or non-volatile memory chips, a unit of each of the memory areas M1 to Mn may be a memory chip. Alternatively, the memory 830 may be implemented so that the unit of each of the memory areas M1 to Mn corresponds to various sizes defined in the memory, such as a semiconductor die, a block, a bank, and a rank.

According to an embodiment, the plurality of memory areas M1 to Mn may have a hierarchical structure. For example, the first memory area M1 may be an upper level memory, and the n-th memory area Mn may be a lower level memory. The higher level memory may have a relatively small capacity and a faster response speed, and the lower level memory may have a relatively large capacity and a slower response speed. Due to this difference, an achievable minimum latency (or maximum latency) or a maximum error correction level of each memory area may be different.

Accordingly, a host may set an error correction option for each of the memory areas M1 to Mn. In this case, the host may transmit a plurality of error correction option setting messages to the memory controller 821. Each error correction option setting message may include a reference latency, a reference error correction level, and an identifier for identifying a memory area. Accordingly, the memory controller 821 may confirm a memory area identifier of the error correction option setting message and set the error correction option for each of the memory areas M1 to Mn.

As another example, a variable ECC circuit or a fixed ECC circuit may perform an error correction operation according to a memory area in which data to be read is stored. For example, data of higher importance may be stored in a higher level memory, and accuracy may be weighted rather than latency. Accordingly, the operation of the variable ECC circuit may be omitted for data stored in the upper level memory, and the error correction operation may be performed by the fixed ECC circuit. As another example, data of low importance may be stored in the lower level memory. The data stored in the lower level memory is weighted to the latency, and thus, the operation by the fixed ECC circuit may be omitted. That is, the read data may be immediately transmitted to the host without error correction or the error correction operation by the variable ECC circuit in response to the read request. According to the importance of data and the memory area in which the data is stored, the selective and parallel error correction operations may be performed in various ways and are not limited to the above-described embodiment.

The memory area identifier may also be included in a response message of the memory controller 821. A read request message may include the memory area identifier together with an address of the data to be read. The response message may include the memory area identifier with respect to the memory area including the read data.

Figure 11A:
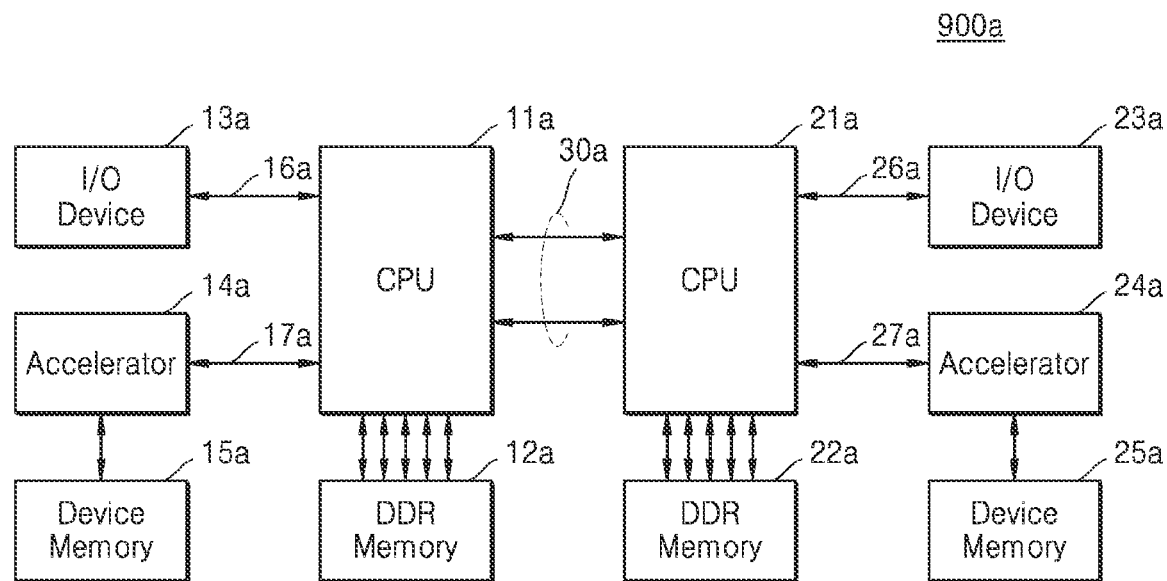
FIGS. 11A and 11B are block diagrams illustrating examples of systems according to an embodiment of the inventive concept.
Figure 11B:
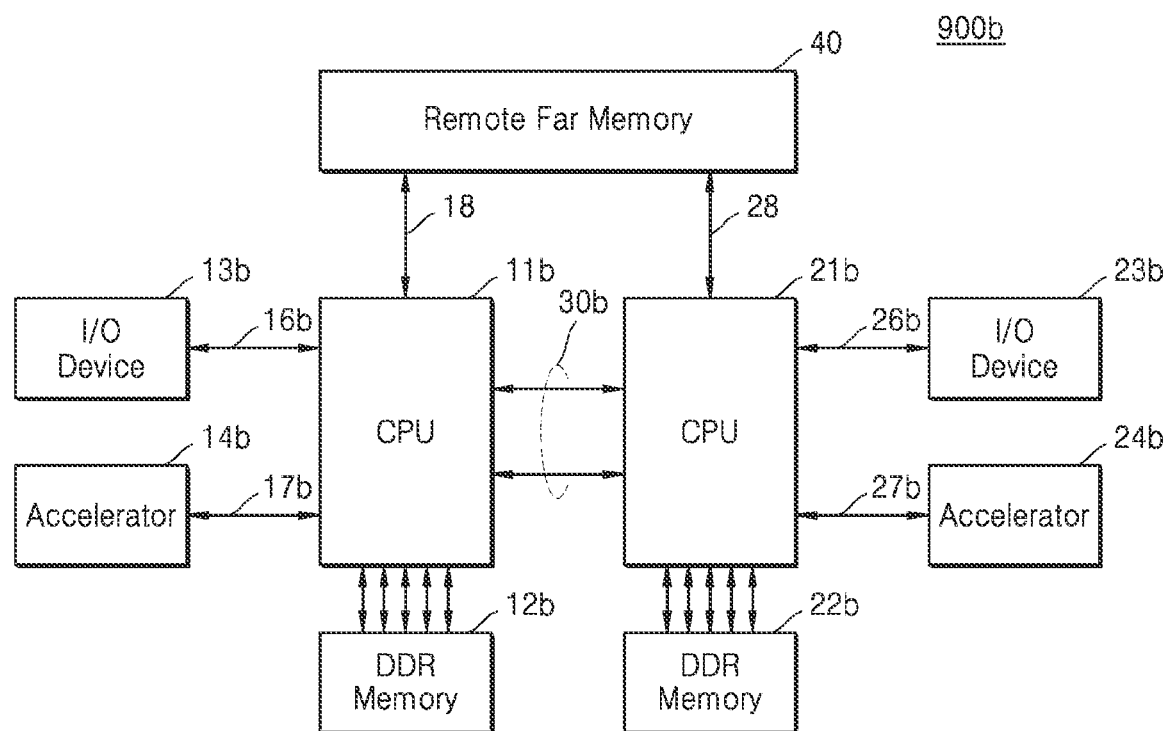

FIGS. 11A and 11B illustrate examples of systems 900a and 900b according to an embodiment of the inventive concept.

Specifically, the block diagrams of FIGS. 11A and 11B illustrate the systems 900a and 900b including multiple CPUs. In the following descriptions regarding FIGS. 11A and 11B, repeated descriptions are omitted.

Referring to FIG. 11A, the system 900a may include first and second CPUs 11a and 21a and may include first and second double data rate (DDR) memories 12a and 22a, which are respectively connected to the first and second CPUs 11a and 21a. The first and second CPUs 11a and 21a may be connected to each other via an interconnection system 30a that is based on a processor interconnection technique. As shown in FIG. 11A, the interconnection system 30a may provide at least one CPU-to-CPU coherent link.

The system 900a may include a first I/O device 13a and a first accelerator 14a, which communicate with the first CPU 11a, and may include a first device memory 15a connected to the first accelerator 14a. The first CPU 11a may communicate with the first I/O device 13a via a bus 16a and may communicate with the first accelerator 14a via a bus 17a. In addition, the system 900a may include a second I/O device 23a and a second accelerator 24a, which communicate with the second CPU 21a, and may include a second device memory 25a connected to the second accelerator 24a. The second CPU 21a may communicate with the second I/O device 23a via a bus 26a and may communicate with the second accelerator 24a via a bus 27a.

Protocol-based communication may be performed through the buses 16a, 17a, 26a, and 27a, and a protocol may support the selective and parallel error correction operations described above with reference to the drawings. Accordingly, the latency required for the error correction operation with respect to a memory, for example, the first device memory 15a, the second device memory 25a, the first DDR memory 12a and/or the second DDR memory 22a may be reduced and the performance of the system 900a may be improved.

Referring to FIG. 11B, similar to the system 900a of FIG. 11A, the system 900b may include first and second CPUs 11b and 21b, first and second DDR memories 12b and 22b, first and second I/O devices 13b and 23b, and first and second accelerators 14b and 24b, and may further include a remote far memory 40. The first and second CPUs 11b and 21b may communicate with each other via an interconnection system 30b. The first CPU 11b may be connected to the first and second I/O devices 13b and 23b via buses 16b and 17b, respectively, and the second CPU 21b may be connected to the first and second accelerators 14b and 24b via buses 26b and 27b, respectively.

The first and second CPUs 11b and 21b may be connected to the remote far memory 40 via first and second buses 18 and 28, respectively. The remote far memory 40 may be used for the extension of memory in the system 900b, and the first and second buses 18 and 28 may be used as memory extension ports. A protocol corresponding to the first and second buses 18 and 28 as well as the buses 16a, 17a, 26a, and 27a may also support the selective and parallel error correction operations described above with reference to the drawings. Accordingly, the latency required for error correction with respect to the remote far memory 40 may be reduced and the performance of the system 900b may be improved.

Figure 12:
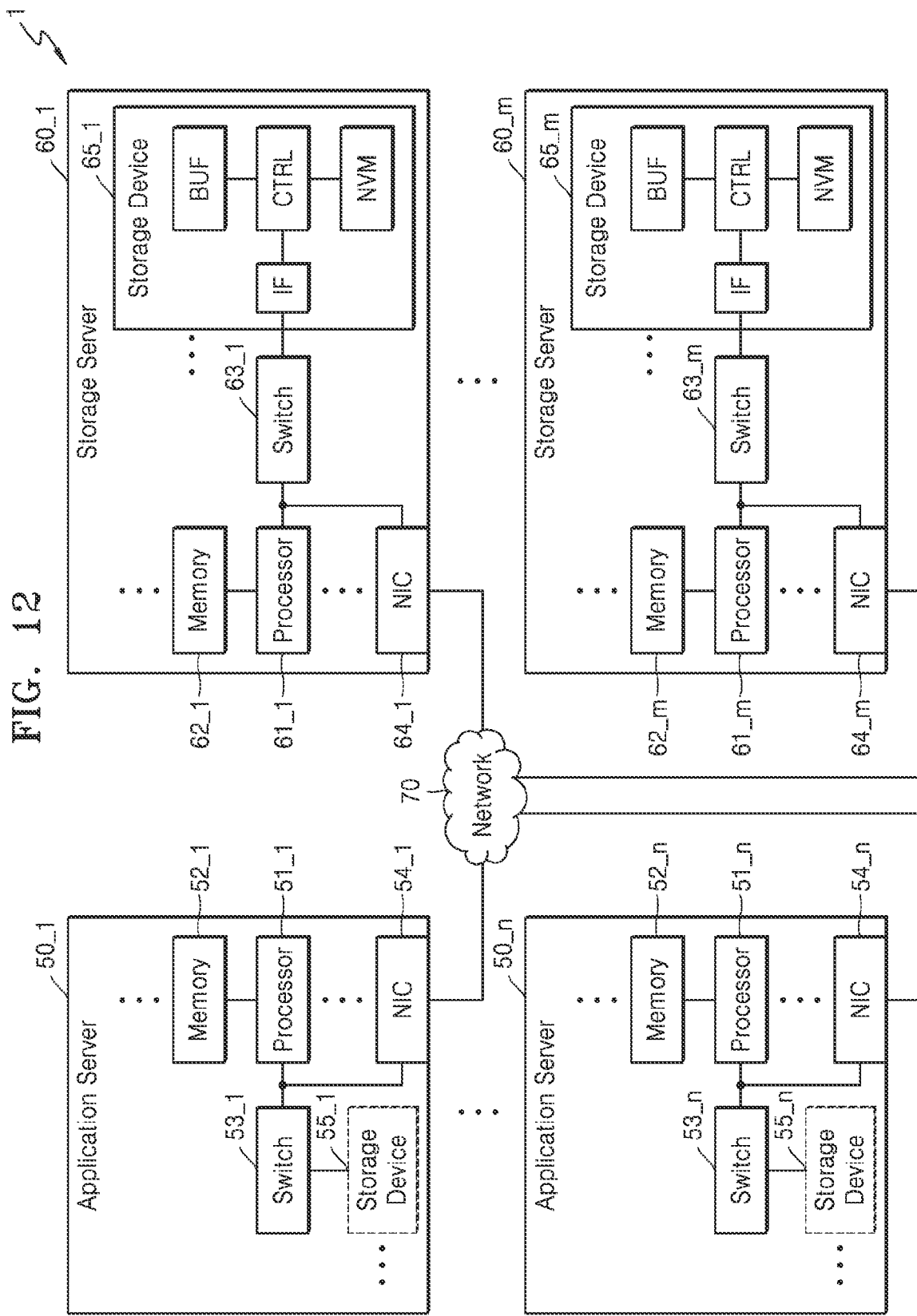
FIG. 12 is a block diagram illustrating a data center including a system according to an embodiment of the inventive concept.

FIG. 12 illustrates a data center 1 including a system according to an embodiment of the inventive concept.

In some embodiments, the system described above with reference to the drawings may be included in the data center 1 as an application server and/or a storage server. In addition, an embodiment related to selective and parallel error correction operations of a memory controller applied to the embodiments of the inventive concept may be applied to each of the application server and the storage server.

Referring to FIG. 12, the data center 1 may collect various data and provide services and may be referred to as a data storage center. The data center 1 may be a system for operating a search engine and a database and may be a computing system used in companies, such as banks, or in government agencies. As shown in FIG. 12, the data center 1 may include application servers 50_1 to 50_n and storage servers 60_1 to 60_m (m and n are integers greater than 1). The number n of application servers 50_1 to 50_n and the number m of storage servers 60_1 to 60_m may be variously selected according to embodiments, and the number n of application servers 50_1 to 50_n may be different from the number m of storage servers 60_1 to 60_m.

The application servers 50_1 to 50_n may include at least one of processors 51_1 to 51_n, memories 52_1 to 52_n, switches 53_1 to 53_n, network interface controllers (NICs) 54_1 to 54_n, and storage devices 55_1 to 55_n The processors 51_1 to 51_n may control all operations of the application servers 50_1 to 50_n and may access the memories 52_1 to 52_n to execute instructions and/or data loaded into the memories 52_1 to 52_n. The memories 52_1 to 52_n may include, but are not limited to, double data-rate synchronous DRAM (DDR SDRAM), high bandwidth memory (HBM), a hybrid memory cube (HMC), a dual in-line memory module (DIMM), an Optane DIMM, or a non-volatile DIMM (NVMDIMM).

According to embodiments, the respective numbers of processors and memories, which are included in the application servers 50_1 to 50_n, may be variously selected. In some embodiments, the processors 51_1 to 51_n and the memories 52_1 to 52_n may provide processor-memory pairs. In some embodiments, the number of processors 51_1 to 51_n may be different from the number of memories 52_1 to 52_n. The processors 51_1 to 51_n may include single-core processors or multi-core processors. In some embodiments, as illustrated by a dashed line in FIG. 12, the storage devices 55_1 to 55_n may be omitted from the application servers 50_1 to 50_n. The number of storage devices 55_1 to 55_n included in the application servers 50_1 to 50_n may be variously selected according to embodiments. The processors 51_1 to 51_n, the memories 52_1 to 52_n, the switches 53_1 to 53_n, the NICs 54_1 to 54_n, and/or the storage devices 55_1 to 55_*n* communicate with each other through the link described above with reference to the drawings.

The storage servers 60_1 to 60_*m* may include at least one of processors 61_1 to 61_*m*, memories 62_1 to 62_*m*, switches 63_1 to 63_*m*, NICs 64_1 to 64_*n*, and storage devices 65_1 to 65_*m*. The processors 61_1 to 61_*m* and the memories 62_1 to 62_*m* may operate similarly to the processors 51_1 to 51_*n* and the memories 52_1 to 52_*n* of the application servers 50_1 to 50_*n* described above.

The application servers 50_1 to 50_*n* and the storage servers 60_1 to 60_*m* may communicate with each other via a network 70. In some embodiments, the network 70 may be implemented by using Fibre Channel (FC), Ethernet, etc. The FC may be a medium used for relatively high-speed data transmission and may use an optical switch providing high performance and/or high availability. According to access methods of the network 70, the storage servers 60_1 to 60_*m* may be provided as file storage, block storage, or object storage.

In some embodiments, the network 70 may include a storage-dedicated network such as a storage area network (SAN). For example, the SAN may use an FC network and may be an FC-SAN implemented according to the FC Protocol (FCP). Alternatively, the SAN may include an Internet Protocol (IP)-SAN, which uses a Transmission Control Protocol (TCP)/IP network and is implemented according to an Internet Small Computer System Interface (iSCSI, or SCSI over TCP/IP) protocol. In some embodiments, the network 70 may include a general network such as a TCP/IP network. For example, the network 70 may be implemented according to a protocol such as FC over Ethernet (FCoE), Network Attached Storage (NAS), or NVMe over Fabrics (NVMe-oF).

Hereinafter, the application server 50_1 and the storage server 60_1 will be mainly described, but descriptions of the application server 50_1 may also be applied to another application server (e.g., 50_*n*), and descriptions of the storage server 60_1 may also be applied to another storage server (e.g., 60_*m*).

The application server 50_1 may store data, which a user or a client has requested to store, in one of the storage servers 60_1 to 60_1*m* via the network 70. In addition, the application server 50_1 may obtain data, which a user or a client has requested to read, from one of the storage servers 60_1 to 60_1*m* via the network 70. For example, the application server 50_1 may be implemented by a web server, a database management system (DBMS), or the like.

The application server 50_1 may access a memory 52_*n* or a storage device 55_*n*, which is included in the other application server 50_*n*, via the network 70 and/or may access the memories 62_1 to 62_*m* or the storage devices 65_1 to 65_*m* respectively included in the storage servers 60_1 to 60_*m* via the network 70. Thus, the application server 50_1 may perform various operations on data stored in the application servers 50_1 to 50_*n* and/or the storage servers 60_1 to 60_*m*. For example, the application server 50_1 may execute instructions for moving or copying data between the application servers 50_1 to 50_*n* and/or the storage servers 60_1 to 60_*m*. Here, the data may be moved from the storage devices 65_1 to 65_*m* of the storage servers 60_1 to 60_*m* to the memories 52_1 to 52_*m* of the application servers 50_1 to 50_*n*, directly or through the memories 62_1 to 62_*m* of the storage servers 60_1 to 60_*m*. In some embodiments, the data moved via the network 70 may be data encrypted for security or privacy.

In the storage server 60_1, an interface IF may provide physical connection between the processor 61_1 and a controller CTRL and physical connection between the NIC 64_1 and the controller CTRL. For example, the interface IF may be implemented in a direct-attached storage (DAS) manner, in which a connection to the storage device 65_1 is directly made by a dedicated cable. In addition, for example, the interface IF may be implemented in various interface manners such as Advanced Technology Attachment (ATA), Serial ATA (SATA), external SATA (e-SATA), Small Computer Small Interface (SCSI), Serial Attached SCSI (SAS), Peripheral Component Interconnect (PCI), PCI express (PCIe), NVM express (NVMe), IEEE 1394, universal serial bus (USB), a secure digital (SD) card, a multi-media card (MMC), an embedded multi-media card (eMMC), Universal Flash Storage (UFS), embedded Universal Flash Storage (eUFS), and a compact flash (CF) card interface, or the like.

In the storage server 60_1, the switch 63_1 may selectively connect the processor 61_1 to the storage device 65_1 or selectively connect the NIC 64_1 to the storage device 65_1, according to control by the processor 61_1.

In some embodiments, the NIC 64_1 may include a network interface card, a network adaptor, etc. The NIC 64_1 may be connected to the network 70 by a wired interface, a wireless interface, a Bluetooth interface, an optical interface, etc. The NIC 64_1 may include an internal memory, a digital signal processor (DSP), a host bus interface, etc. and may be connected to the processor 61_1 and/or the switch 63_1. In some embodiments, the NIC 64_1 may be integrated with at least one of the processor 61_1, the switch 63_1, and the storage device 65_1.

In the application servers 50_1 to 50_*n* or the storage servers 60_1 to 60_*m*, the processors 51_1 to 51_*m* and 61_1 to 61_*n* may transmit commands to the storage devices 55_1 to 55_*n* and 65_1 to 65_*m* or the memories 52_1 to 52_*n* and 62_1 to 62_*m* and thus program data thereto or read data therefrom. Here, the data may be data that is error-corrected by an error correction code (ECC) engine. The data may be data having undergone data bus inversion (DBI) or data masking (DM) and may include CRC information. The data may be data encrypted for security or privacy.

The storage devices 55_1 to 55_*n* and 65_1 to 65_*m* may transmit control signals and command/address signals to a non-volatile memory device NVM (e.g., a NAND flash memory device) in response to read commands received from the processors 51_1 to 51_*m* and 61_1 to 61_*n* Accordingly, when data is read from the non-volatile memory device NVM, a read enable signal may be input as a data output control signal and thus function to cause the data to be output to a DQ bus. A data strobe may be generated by using the read enable signal. A command and an address signal may be latched according to rising edges or falling edges of a write enable signal.

The controller CTRL may take overall control of operations of the storage device 65_1. In an embodiment, the controller CTRL may include static random-access memory (SRAM). The controller CTRL may write data to the non-volatile memory device NVM in response to a write command or may read data from the non-volatile memory device NVM in response to the read command. For example, the write command and/or the read command may be generated based on a request provided by a host, for example, the processor 61_1 in the storage server 60_1, the processor 61_*m* in the other storage server 60_*m*, or the processors 51_1 to 51_*n* in the application servers 50_1 and 50_*n*. A buffer BUF may temporarily store (buffer) data which is to be written to or has been read from the non-volatile memory device NVM. In addition, the buffer BUF may store DRAM. Also, the buffer BUF may store meta data, and the meta data may refer to user data or data generated by the controller CTRL to manage the non-volatile memory device NVM. The storage device 65_1 may include a secure element (SE) for security or privacy.

While the inventive concept has been particularly shown and described with reference to embodiments thereof, it will be understood by those of ordinary skill in the pertinent art that various changes in form and details may be made therein without departing from the spirit and scope of the present disclosure as set forth in the following claims.

What is claimed is:

1. A method performed by a Compute Express Link™ (CXL) device connected to a host processor, the CXL device supporting a CXL memory protocol and at least one second protocol selected from a coherent protocol and a non-coherent protocol, the method comprising:
receiving a first read request from the host processor based on the CXL memory protocol;
transmitting the first read request to a device-attached memory and reading first read data corresponding to the first read request from the memory based on the second protocol;
detecting an error of the first read data;
correcting the error included in the first read data based on at least one of a reference latency or a reference error correction level included in a first error correction option; and
providing first correction data to the host processor based on the CXL memory protocol.

2. The method of claim 1, further comprising:
receiving a device information request from the host processor based on the non-coherent protocol comprising a CXL input/output protocol;
transmitting device information to the host processor; and
receiving the first error correction option from the host processor.

3. The method of claim 2,
wherein the device information is based on a subordinate-to-master (S2M) transaction,
wherein the device information comprises:
a first field data corresponding to a logical device identifier, and
a second field data corresponding to a load level,
wherein the load level is determined based on at least one of a queued request, an internal resource usage or a bandwidth usage.

4. The method of claim 2, wherein the first error correction option is based on a master-to-subordinate (M2S) transaction.

5. The method of claim 1,
wherein the correcting of the error included in the first read data comprises, according to whether it is possible to satisfy the reference error correction level within the reference latency, correcting the error through a fixed error correction circuit or a variable error correction circuit,
wherein the fixed error correction circuit is configured to correct the first read data to an error-free state, and
wherein the variable error correction circuit is configured to correct the first read data to satisfy the reference error correction level.

6. The method of claim 5,
wherein the providing of the first correction data to the host processor comprises further providing a read response to the first read request together with the first correction data corrected by the variable error correction circuit,
wherein the read response comprises an error flag set by the variable error correction circuit.

7. The method of claim 5, wherein the fixed error correction circuit is configured to correct the first read data in parallel with the variable error correction circuit to generate second correction data and store the second correction data in a buffer.

8. The method of claim 7, further comprising:
receiving a second read request for the first read data from the host processor; and
providing the second correction data stored in the buffer to the host processor based on the CXL memory protocol.

9. The method of claim 1,
wherein the CXL memory protocol and the at least one second protocol share a same multiplexed link between the CXL device and the host processor,
wherein the memory comprises at least one storage-class memory.

10. A system comprising:
a host processor comprising at least one core configured to execute instructions;
a Compute Express Link™ (CXL) device connected to the host processor, the CXL device supporting a CXL memory protocol and at least one second protocol selected from a coherent protocol and a non-coherent protocol; and
a memory configured to be accessed through the CXL device,
wherein the CXL device is configured to receive a first read request from the host processor based on the CXL memory protocol, read first read data corresponding to the first read request from the memory based on the second protocol, and perform in parallel a first error correction operation and a second error correction operation, the first error correction operation based on at least one of a reference latency or a reference error correction level included in a first error correction operation, and the second error correction operation based on a maximum error correction level on an error included in the first read data,
wherein the first error correction operation is performed according to whether it is possible to satisfy the reference error correction level within the reference latency.

11. The system of claim 10,
wherein the CXL memory protocol and the at least one second protocol share a same multiplexed link between the CXL device and the host processor,
wherein the CXL device is configured to receive a device information request from the host processor based on the non-coherent protocol comprising a CXL input/output protocol, transmit device information to the host processor, and receive the first error correction option from the host processor.

12. The system of claim 11,
wherein the device information is based on subordinate-to-master (S2M) transaction,
wherein the device information comprises:
a first field data corresponding to a logical device identifier, and
a second field data corresponding to a load level,
wherein the load level is determined based on at least one of a queued request, an internal resource usage or a bandwidth usage.

13. The system of claim 11, wherein the first error correction option is based on a master-to-subordinate (M2S) transaction.

14. The system of claim 10,
wherein first correction data generated through the first error correction operation is provided to the host processor based on the CXL memory protocol, and
wherein second correction data generated through the second error correction operation is stored in a buffer.

15. The system of claim 14, wherein the CXL device is configured to generate a read response comprising an error flag, and provide the read response together with the first correction data to the host processor.

16. The system of claim 14, wherein the CXL device is configured to receive a second read request for the first read data from the host processor, and provide the second correction data stored in the buffer to the host processor.

17. The system of claim 16, wherein a time required to generate the first correction data through the first error correction operation is shorter than a time required to generate the second correction data through the second error correction operation.

18. A Compute Express Link™ (CXL) device configured to control a memory accessed by the CXL device connected to a host processor, the CXL device supporting a CXL memory protocol and at least one second protocol selected from a coherent protocol and a non-coherent protocol, the CXL device comprising:
a first interface circuit configured to communicate with the host processor based on the CXL memory protocol;
a second interface circuit configured to communicate with the memory based on the second protocol;
an error detection circuit configured to detect an error present in first read data read from the second interface circuit in response to a first read request received from the first interface circuit;
a variable error correction circuit configured to correct the detected error based on at least one of a reference latency and a reference error correction level included in a first error correction option; and
a fixed error correction circuit configured to correct the detected error in parallel with an operation of the variable error correction circuit, provide the first read data to the variable error correction circuit so that the variable error correction circuit corrects the error according to whether it is possible to satisfy the reference error correction level within the reference latency.

19. The CXL device of claim 18,
wherein the error detection circuit is configured to provide the first read data to the variable error correction circuit,
wherein the variable error correction circuit is configured to correct the error according to whether it is possible to satisfy the reference error correction level within the reference latency.

20. The CXL device of claim 18,
wherein the CXL memory protocol and the at least one second protocol share a same multiplexed link between the CXL device and the host processor,
wherein the CXL device is configured to receive a device information request from the host processor based on the non-coherent protocol comprising a CXL input/output protocol, transmit device information to the host processor, and receive the first error correction option from the host processor.

* * * * *